UNITED STATES PATENT OFFICE.

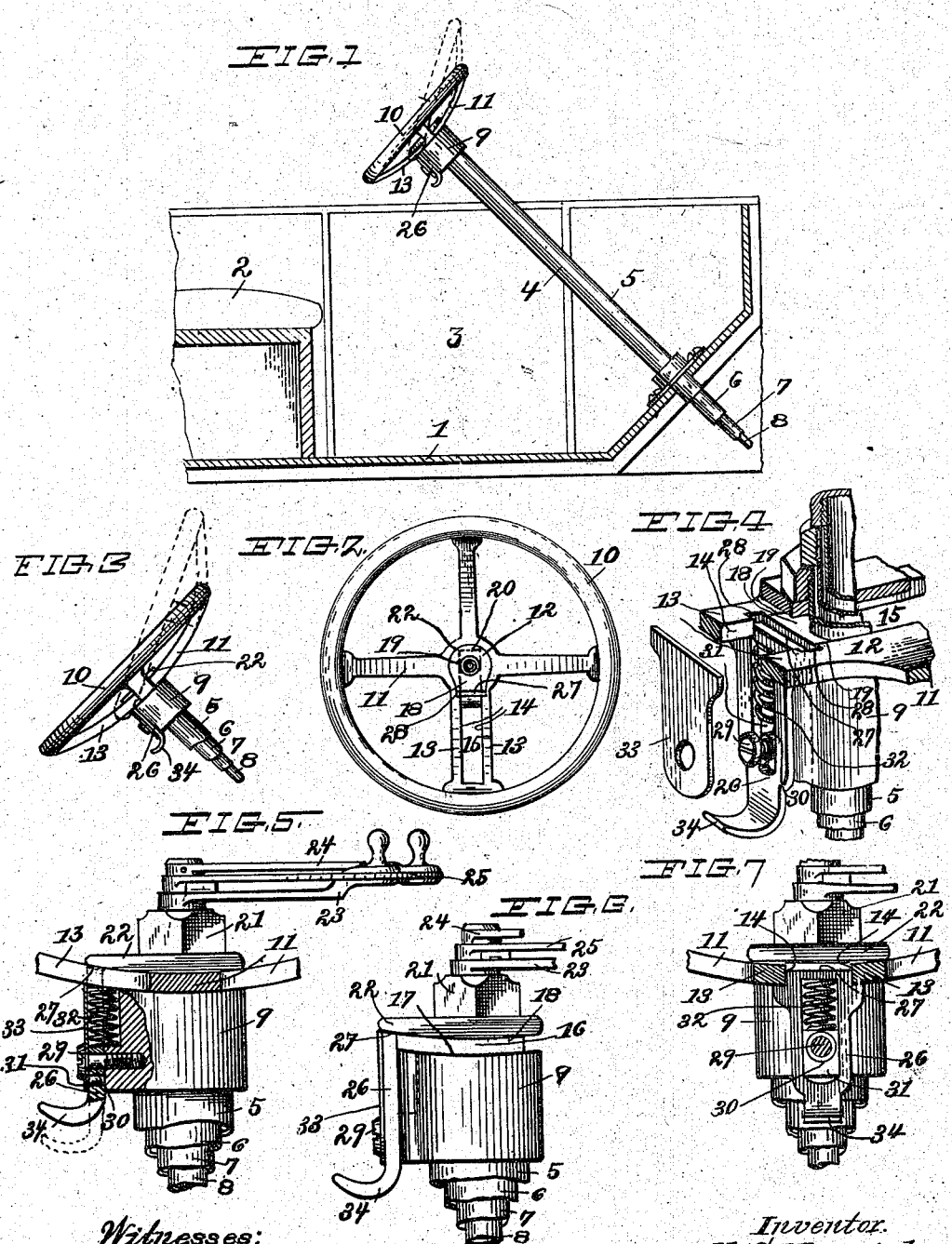

BRAMWELL C. HOLWICK, OF CANTON, OHIO.

ADJUSTABLE STEERING-WHEEL FOR MOTOR-VEHICLES.

1,166,458.      Specification of Letters Patent.      Patented Jan. 4, 1916.

Application filed August 30, 1913. Serial No. 787,425.

*To all whom it may concern:*

Be it known that I, BRAMWELL C. HOLWICK, a citizen of the United States, residing at Canton, in the county of Stark and State of Ohio, have invented a new and useful Adjustable Steering-Wheel for Motor-Vehicles, of which the following is a specification.

My invention relates to improvements in steering wheels for motor vehicles and the objects of the invention are to generally improve the construction of steering wheels, to provide for the ready adjustment of such a wheel with relation to the steering post, to move said wheel out of its normal position on said post in order to permit the driver to enter or leave the vehicle without being hindered by the projection of said wheel toward the seat.

Further objects are to provide an adjustable steering wheel of the character mentioned in which the wheel will at all times and in all adjustments be in position to control or steer the vehicle if necessary, to simplify the construction while retaining the characteristics of strength and security, to provide means for locking the wheel in the normal position to prevent accidental adjustment or displacement thereof, and to accomplish all of these objects by a construction neat in appearance, having few moving parts, and not liable to get out of order or need repair.

These objects, together with other objects readily apparent to those skilled in the art, may be attained by the construction illustrated in the accompanying drawings, although the invention may be embodied in other forms, the construction illustrated being chosen by way of example.

In the drawings Figure 1 is a view of a portion of a motor vehicle including the steering post provided with a steering wheel embodying my invention. Fig. 2 is a top view of the steering wheel. Fig. 3 is a side elevation of the steering wheel, showing the same in forward adjusted position in dotted lines. Fig. 4 is a fragmentary detail of the steering head and a portion of the steering wheel, also illustrating the construction of the spring catch. Fig. 5 is a side elevation of the upper end of the steering post, including the head, a portion of the head being broken away to disclose the construction of the spring catch. Fig. 6 is a similar view, the steering wheel, however, being entirely removed. Fig. 7 is a rear elevation of the head, showing the spring catch in elevation and the spaced head engaging spokes being shown in section.

Throughout the several views similar reference numerals indicate similar parts.

More specifically describing the construction illustrated in said drawings, the numeral 1 indicates the floor, the numeral 2 the seat and the numeral 3 the fore door of a motor vehicle provided with the steering post 4. Said steering post comprises the outer stationary casing 5, the hollow steering shaft 6 within the casing 5, and the throttle and spark controlling shafts 7 and 8 within the shaft 6.

In accordance with the well known construction the steering post is provided with the steering head 9 which is fixedly connected to the steering shaft 6 and which rotates with said shaft in the steering of the vehicle. The steering wheel is provided with the rim 10 and a plurality of spokes 11 of usual construction extending from the rim 10 to the hub portion 12. Also extending from the rim 10 to the hub portion 12 are the spaced, parallel spokes 13 provided with inner, opposing parallel edges 14 producing a slot 15 extending substantially from the rim 10 to a point beyond the center of the hub portion 12, as clearly illustrated in Fig. 2. All of the spokes 11 and 13 should preferably be curved or dished as will be understood from an inspection of Figs. 1 and 3, thus locating the hub portion 12 forwardly and downwardly with relation to the plane of the rim 10.

In the top of the steering head 9 are arranged two lateral, parallel grooves 16 the bottom surfaces 17 of which are curved to the same radius as the spokes 13 of the steering wheel. The said grooves thus form on the top of the head 9 the rectangular portion 18, the parallel sides 19 of which slidably engage the inner edges 14 of the spokes 13, the forward edge 20 of which is adapted to engage the forward edge of the slot 15 to limit the backward sliding movement of the steering wheel from the forward adjusted position to the normal position.

On top of the hub portion 12 of the steering wheel and connected to the steering shaft 6 by means of the nut 21 is the cap 22 which extends laterally beyond the edges 19 so as to overlie the spokes 13, and preferably extends forwardly beyond the edge 20 so as to overlie a portion of the hub portion 12, as illustrated in Fig. 2, when the steering wheel is in the normal position. It will thus be readily understood that the cap 22 co-acts with the bottom faces 17 of the grooves 16 to retain the steering wheel in connected relation to the head 9 at all times, while permitting the wheel to be slidably moved from the normal position shown in full lines in Fig. 3 to the forward adjusted position illustrated in dotted lines in said figure. It will be readily understood, and should be pointed out at this place that the steering wheel is at all times non-rotatable with reference to the head 9 by reason of the engagement of the edges 19 with the edges 14 regardless of the adjustment of the steering wheel, so that even when the steering wheel is in the forward adjusted position as illustrated in the dotted lines in Fig. 3, the said wheel is in proper connection with the shaft 6 to guide the vehicle in case of emergency, such as the unintentional starting by gravity of the vehicle, as down a grade, after the same has been stopped and the wheel moved forward into the adjusted position with the intention, on the part of the driver, of leaving the vehicle.

The throttle and spark levers 23 and 24 respectively and the segment 25 over which said levers travel may be connected to the steering post and to their respective shafts in the usual manner and are independent of the steering wheel regardless of its adjustment.

For the purpose of locking the steering wheel in the normal position the catch 26 is provided, which catch is formed with the spoke engaging end 27 adapted to enter into notches 28 on the inner sides of the spokes 13 when the wheel is in the normal position for steering. The catch 26 is connected to the head 9 by means of a screw 29. Said screw 29 supports a sleeve 30 which is received into a slot 31 in the catch 26, and a spring 32 arranged between the sleeve 30 and the upper end of the slot 32 is adapted to normally urge the catch 26 into upper position. A plate 33, held in position by the screw 29, retains the spring 32 within the slot 31 and gives a neat finished appearance, while permitting the catch 32 to be vertically slidably moved by pushing downward upon the thumb portion 34 when it is desired to withdraw the catch 26 from the notches 28. When said catch has been so moved a mere forward push of the rim 10 of the driving wheel will cause the said wheel to slide into the forward adjusted position illustrated in Fig. 3, in which position it will remain until it is again desired to bring it to the normal steering position. In moving to the forward adjusted position it will be noted that the curvature of the spokes 3 causes the wheel to move through a curve, throwing the upper edge of the rim 10 rather upwardly than forwardly, so that in the case of motor vehicles in which the wind shield or other parts are closely adjacent the steering wheel there will be no interference between said shield and wheel. When in the forward adjusted position the lower portion of the rim will lie over closely adjacent the head 9, so that there is substantially no further rearward projection of the steering post than the head 9 itself. To bring it to the steering position it is only necessary to grasp the rim 10 and pull backwardly upon the wheel, whereupon the spokes 13 will slide within the curved grooves 16 until the forward edge 20 of the slot 15 engages the front edge of the rectangular portion 18. At this point, the catch 26 will be moved by the spring 32 into the notches 28, whereupon the wheel will be locked in the normal position until the catch 26 is again intentionally withdrawn by the driver.

While the construction thus disclosed is the best form in which I have contemplated embodying my invention I do not desire to be limited to the details shown and described, as it is evident that many changes may be made as circumstances require or experience suggests without departing from the spirit of the invention, within the scope of the appended claims.

I claim:—

1. An adjustable steering wheel for motor vehicles, comprising a steering shaft and a steering wheel provided with downwardly curved spokes directly slidably connected to said shaft, whereby, when said wheel is transversely slidably moved with relation to said shaft, it will pass through a curved course determined by the curvature of said spokes.

2. An adjustable steering wheel for motor vehicles, comprising a steering shaft provided with a head having parallel, curved grooves, and a steering wheel provided with parallel, curved spokes extending from the hub to the rim thereof seated in said grooves and slidable therein.

3. An adjustable steering wheel for motor vehicles, comprising a steering shaft provided with a head having parallel portions, a steering wheel provided with a rim portion, a hub portion, and spaced, parallel, curved spokes extending from said hub portion to said rim portion, said parallel spokes slidably engaging the parallel portions of said head, wheel retaining means connected to said head and adapted to retain said wheel in operative connection with said head while permitting sliding movement of said wheel from the normal position in which said head is arranged concentrically with reference to said rim, to the adjusted position in which said rim lies closely adjacent said head and releasable locking means for locking said wheel in said normal position.

4. A device of the character described comprising, in combination with the steering shaft of a motor vehicle, a steering wheel provided with downwardly dished spokes, two of said spokes extending parallel with each other from the rim of said wheel to approximately the hub thereof, and means engaging said steering shaft and parallel spokes for slidably connecting said spokes to said shaft, whereby said wheel may be moved through a curved course to bring the rim or the hub thereof adjacent said steering shaft.

5. A device of the character described comprising, in combination with the steering shaft of a motor vehicle, a steering wheel provided with downwardly dished, curved spokes, connecting means connecting said wheel to said shaft and provided with spoke engaging portions curved to the same radius as said spokes and adapted to permit said wheel to be slidably moved with reference to said shaft through a curved course, whereby to bring said wheel into position with its hub or its rim adjacent said steering shaft, as desired.

6. A device of the character described comprising, in combination with the steering shaft of a motor vehicle, a steering wheel provided with two downwardly dished, curved, parallel spokes, a steering head connected to said shaft and slidably engaging said parallel spokes, said head provided with surfaces corresponding in curvature to and engaging said parallel spokes, said spokes provided, adjacent the hub, with notches, means for holding said parallel spokes in engagement with said steering head and a spring actuated catch on said steering head adapted to automatically enter said notches when the steering wheel is in the normal steering position to prevent sliding movement of said wheel, an further adapted to be manually withdrawn from said notches to permit said wheel to be slidably moved through a curved course determined by the curvature of said spokes, to move the rim of said wheel into position adjacent said shaft.

7. In combination a steering post, a hand wheel mounted upon the steering post and movable forwardly and upwardly into an approximately vertical position and coöperating members forming sliding connecting means between the post and wheel to cause both to turn together and to direct the wheel in its two-fold movement, one of such members having a diametrical arrangement and departing from a straight line to cause the wheel to assume a substantially vertical position.

8. In combination a steering post, a head on the steering post, a hand wheel mounted upon the steering post, and a guide member carried by the wheel and slidingly engaging the head of the post to cause both to turn together, said guide member having a diametrical arrangement and having its elements departing from a straight line to throw the wheel into an approximately vertical position simultaneously with its radial sliding movement.

9. The combination with a steering post and a hand-wheel, of a head on the steering post, and curved guide means connected with the hand-wheel and having a transverse sliding engagement with the said head to secure the hand-wheel to the steering post to turn therewith and free to slide transversely of the steering post in a curved path to an eccentric and relatively inclined position.

10. In combination, a steering post, a hand-wheel, coöperative sliding connecting means between the steering post and hand-wheel disposed a distance below the upper end of the steering post and having the guide member on the hand-wheel extending along opposite sides of the steering post, and controlling elements at the upper end of the steering post above the slidably mounted hand-wheel.

11. In combination, a steering post, controlling elements at the upper end of the steering post, a head on the steering post beneath the controlling elements, a hand wheel arranged beneath the said controlling elements, and guides on the hand wheel curved radially and spaced transversely and engaging the head on opposite sides of the steering post to admit of the hand wheel turning with the steering post and having a simultaneous transverse and angular sliding movement to an eccentric and non-rightangular position with the steering post.

12. The combination with a shaft having a head thereon, of a steering wheel having spaced parallel downwardly bowed guides between which the head is received and with which it has sliding engagement, the space between said guides being entirely unobstructed, said wheel being thereby shiftable from a position concentric to the shaft to a position eccentric to the shaft, and manually operable means for locking the wheel in a position concentric to the shaft.

13. The combination with a hollow shaft and hollow head thereon, of a steering wheel having spaced parallel guides between which the head is received and with which the head has sliding engagement, the space between said guides being entirely unobstructed, means for latching the wheel in a position concentric to the shaft, controlling shafts disposed within the tubular steering shaft, and controlling levers mounted upon said shafts and disposed above the steering wheel.

In testimony that I claim the above, I have hereunto subscribed my name in the presence of two witnesses.

BRAMWELL C. HOLWICK.

Witnesses:
WILLIAM H. MILLER,
NILES A. SPONSELLER.